Figure 1:
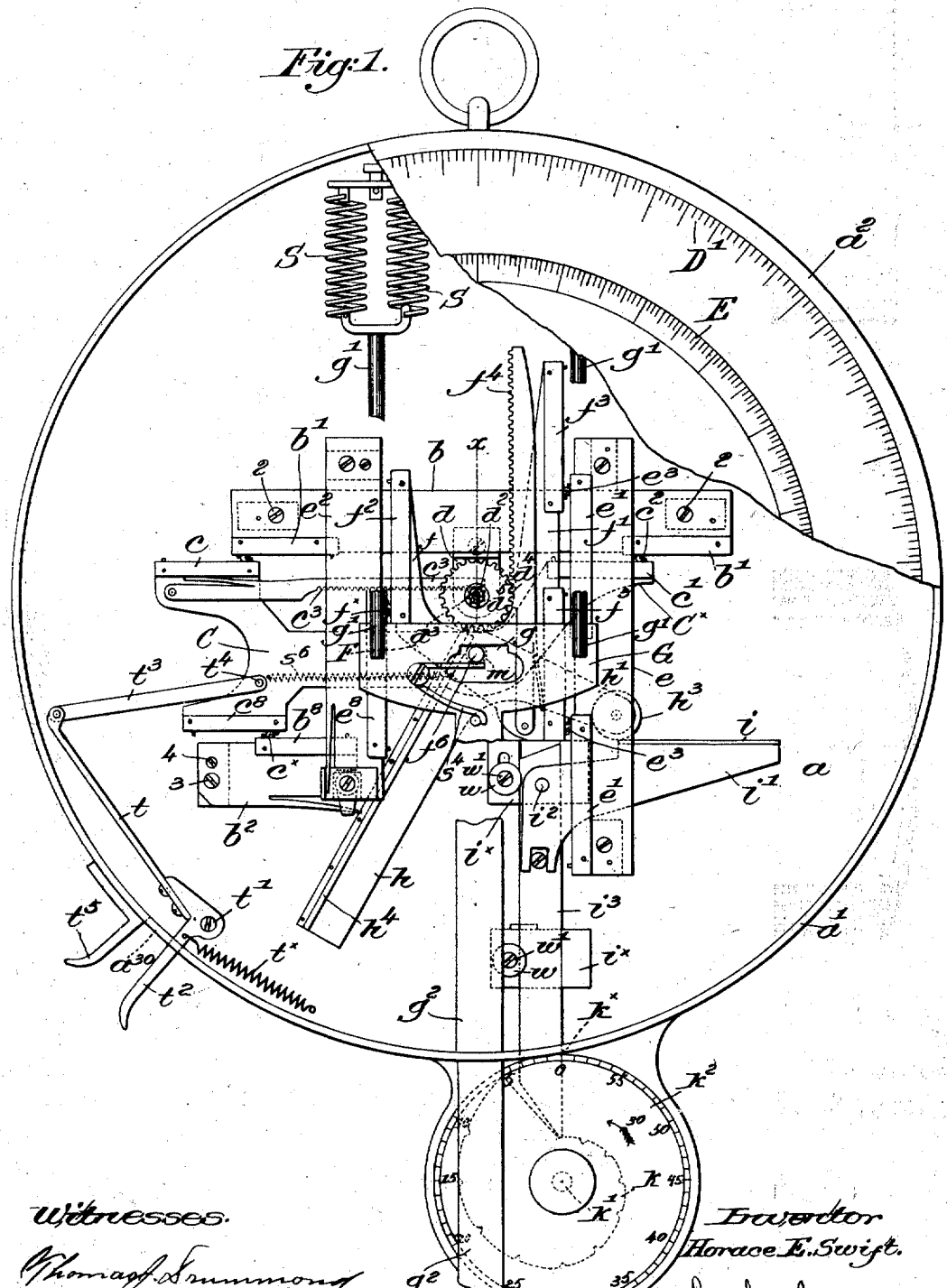

(No Model.) 2 Sheets—Sheet 1.

H. E. SWIFT.
PRICE COMPUTING SCALE.

No. 563,246. Patented June 30, 1896.

Witnesses
Thomas J. Drummond
Fred S. Greenleaf

Inventor
Horace E. Swift.
by Crosby & Gregory
attys.

(No Model.) 2 Sheets—Sheet 2.
H. E. SWIFT.
PRICE COMPUTING SCALE.
No. 563,246. Patented June 30, 1896.
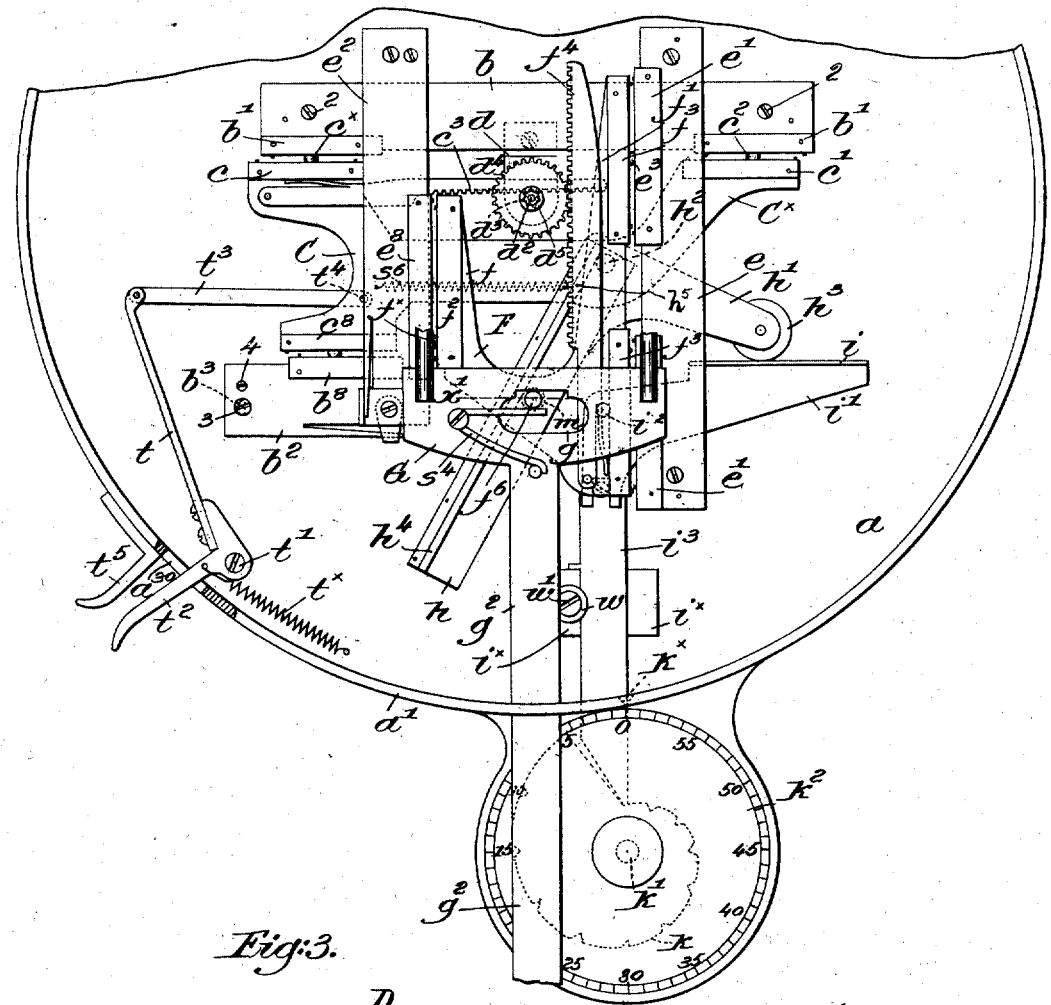
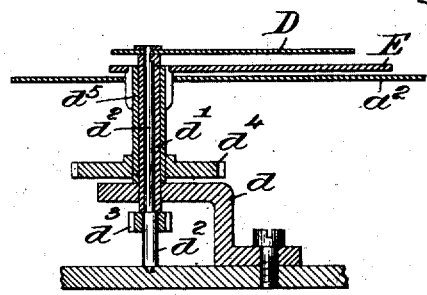
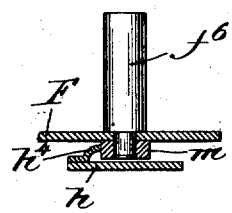
Witnesses.
Thomas J. Drummond.
Fred S. Greenleaf.
Inventor.
Horace E. Swift.
By Crosby & Gregory, attys.

UNITED STATES PATENT OFFICE.

HORACE E. SWIFT, OF BOSTON, MASSACHUSETTS, ASSIGNOR TO THE UNITED STATES COMPUTING SCALE COMPANY, OF PORTLAND, MAINE.

PRICE-COMPUTING SCALE.

SPECIFICATION forming part of Letters Patent No. 563,246, dated June 30, 1896.

Application filed September 3, 1895. Serial No. 561,186. (No model.)

*To all whom it may concern:*

Be it known that I, HORACE E. SWIFT, of Boston, county of Suffolk, State of Massachusetts, have invented an Improvement in Price-Computing Scales, of which the following description, in connection with the accompanying drawings, is a specification, like letters and figures on the drawings representing like parts.

In United States Patent No. 542,969, granted July 16, 1895, is shown and described a scale which quickly and accurately indicates automatically the weight of an article and computes and indicates automatically the aggregate price thereof according to the unit price determined upon. The weighing and computing mechanisms of the scale forming the subject-matter of the said patent are so cooperatively connected that the computing mechanism will always operate when the weighing mechanism is operated, unless the unit price indicator be set at zero.

This invention has for its object the production of a scale wherein the computing mechanism is normally inoperative and entirely independent of the weighing mechanism, means being provided for setting a controlling member to determine by its angular position the extent of movement of the computing mechanism when the latter is actuated manually, so that under normal conditions the price of an article weighed will not be computed, but if it is desired to ascertain the computed price the controlling member will be set and the computing mechanism operated by the operator. By this construction I am enabled to provide a scale which can be used for general weighing purposes without subjecting the computing mechanism to needless wear, but which can be used for computing whenever desired.

Figure 1 is a front view of a scale embodying my invention, the greater part of the face-plate being broken out to better show the operative parts beneath, with the computing mechanism in normal position. Fig. 2 is a similar view with the case partially broken out, the counterbalancing portion of the weighing mechanism being omitted, the latter mechanism being shown in a position different from that shown in Fig. 1, while the computing mechanism is shown in operative or abnormal position. Fig. 3 is an enlarged sectional detail on the line $x$, Fig. 1; and Fig. 4 is an enlarged detail, partly in section, taken on the line $x'$, Fig. 2.

The casing comprising a back $a$, side walls $a'$, and face plate or dial $a^2$ inclose the operative parts of the scale, the majority of which parts are precisely the same as in the patent referred to, and such parts will not be herein described in detail.

The bridge $b$, provided with lips or flanges $b'$, having preferably beveled edges, and secured to the back by suitable screws 2, and the bridge $b^2$, mounted on a stand by a set-screw 3, passed through a slot $b^3$ in the bridge, is adjusted by a screw 4, having an eccentric head 5, entering a hole in the bridge and extending into the stand, said bridge $b^2$ having a friction-roll guide $b^8$, which may be brought into exact parallelism with the guides on the bridge $b$ by adjusting the bridge $b^2$.

A Y-shaped traveler C has parallel guides $c$ and $c^8$ on its arms, to hold friction-balls $c^\times$ between them and the guide $b^8$ and the guide at the adjacent end of the bridge $b$, forming ball-bearings for one end of the traveler, a guide $c'$ on the other upturned end $c^\times$ of the plate C coöperating with the other guide on the bridge $b$ to hold a ball $c^2$, so that the traveler is movable back and forth between the bridges.

A bracket D, attached to the back $a$, has secured therein a sleeve-bearing $d'$ at the center of the back, receiving a spindle $d^2$, (see Fig. 3,) stepped in the back and having on it a pinion $d^3$, a hand or pointer D on the projecting upper end of the spindle moving over a scale $D'$. The pinion $d^3$ is engaged by a rack-bar $c^3$, suitably attached to the traveler C, adjacent the guide $c$, movement of the traveler toward the right, Figs. 1 and 2, thereby causing the hand D to move through an arc on the dial proportional to the extent of movement of the traveler.

A fixed bridge $e$ at right angles to the bridge $b$ and an adjustable bridge $e^2$ are provided, respectively, with guides $e'$ and a guide $e^8$, the latter being located opposite the adjacent ends of the former.

A carriage F has arms $f$ and $f'$ extended between the bridges $e$ and $e^2$ and provided, respectively, with guides $f^2\ f^3$, the longer arm $f'$ having two guides thereon, forming bearings for friction rolls or balls $e^3$, the guide $f^2$ coöperating with the guide $e^8$ and roll $f^\times$, whereby the carriage F is supported on three ball-bearings and movable toward and from the center of the scale. A rack-bar $f^4$, mounted on the carriage, engages a pinion $d^4$, fast on a sleeve $d^5$, rotatable on the extended bearing $d'$, the sleeve $d^5$ resting on the bracket $d$ and carrying at its upper end a hand E, which coöperates with the scale E' on the dial, graduated to represent pounds and portions thereof, travel of the carriage from one to the other end of its path causing the pinion and hand E to make one complete revolution.

A post or stud $f^6$ is rigidly secured to the carriage F to enter an opening $g$ in a yoke-plate G, Fig. 1, connected by rods $g'$ to usual counterbalancing-springs S, attached to the casing, the yoke-plate being reduced in width at $g^2$ and extending through an opening in the wall $a'$ to carry at its outer end a hook or other suspending device. (Not shown.) Return of the carriage suddenly to normal position with a shock is prevented by a spring $s^4$, mounted on the yoke and bearing against the stud $f^6$, holding the latter against the upper edge of the opening $g$.

As the weight of an article on the bar $g^2$ will draw the carriage F down for a distance proportional to such weight the throw of rack $f^4$ will vary, causing the pinion $d^4$ and the hand E to be rotated a corresponding amount, whereby the weight is indicated on the scale E' of dial $a^2$.

The computing mechanism comprises the traveler C, the revoluble hand D, and the rack-and-pinion connection therebetween, entirely independent of the measuring mechanism herein described, the latter and the computing mechanism *per se* being herein shown as precisely like that in the patent referred to, to which reference may be had, like parts herein receiving the same reference-letters as in the patent.

In this present invention the computing mechanism is normally inoperative, and when it is desired to compute the price of the article the computing mechanism is moved by hand, the extent of movement thereof being determined by the angular position of a controlling member, so that the movement of the measuring mechanism will permit movement of the computing mechanism in a certain ratio, manually-operable means being provided for fixing the angularity of the controlling member in accordance with the unit price of the article to be weighed.

An elbow-lever is pivoted at $t'$ within the casing, the short arm $t^2$ projecting through a slot $a^{30}$ in the side wall $a'$ and forming a finger-piece, the longer arm $t$, within the casing, being pivotally connected by a link $t^3$ to the traveler C at $t^4$, a spring $t^\times$ maintaining the lever and traveler under normal conditions at the extreme left, Fig. 1. For convenience a fixed finger-piece $t^5$ is secured to the side wall $a'$ exteriorly, and by grasping the finger-pieces $t^2$ and $t^5$ between the thumb and fingers the operator can, by pressure, move the former, turning the lever on its pivot $t'$ and moving the traveler C to the right, as in Fig. 2. Obviously a straight push-rod could be used instead of the device herein shown, or other means for manually moving the traveler could be employed with equal facility, it being understood that such movement of the traveler operates the computing mechanism. It will be evident that the extent of such movement of the computing mechanism must be controlled in such manner as to correspond with the extent of movement of the weighing mechanism, and I have adopted means for controlling the movement of the computing mechanism very similar to the means employed in the patent referred to for a like purpose.

A controlling member, shown as an L-shaped lever $h\ h'$, is pivoted at $h^2$ to the traveler C, so that when the latter is in inoperative position the pivot $h^2$ will be in line with the spindle $d^2$ and stud $f^6$, the arm $h'$ carrying, preferably, a roll $h^3$, adapted to run on a track $i$ on one edge of a plate $i'$, pivoted at $i^2$ to a slide-bar $i^3$, longitudinally movable in grooved bearings $i^\times$ and held in place therein by washers $w$ on set-screws $w'$. As in the Patent No. 542,969 the outer end of the slide bar $i^3$ passes through the casing, bearing against and being controlled by an evolute plate $k$, (see dotted lines, Figs. 1 and 2,) mounted on a rotatable post $k'$, having thereon a dial $k^2$, graduated to indicate the unit price, sixty divisions being shown. Rotation of the post $k'$ in direction of arrow 30, Fig. 1, will move the slide-bar $i^3$ inward, the position of plate $i'$ and bar being shown in Figs. 1 and 2 when set at the highest unit price, the numeral "60" being omitted from the dial $k^2$ in the drawings, as it denotes the same graduation on the dial as the zero. The movement of the plate $i'$ acts through roll $h^3$ to turn the controlling member on its pivot $h^2$ to fix its angular position, said member moving with the traveler C from left to right, and vice versa, whatever be the angularity.

An index-point $k^\times$ (see dotted lines, Figs. 1 and 2) on the dial $a^2$ directs the operator in giving the proper rotation to the dial-plate $k^2$, to manually fix the angularity of the controlling member in accordance with the unit price of the article.

The long arm $h$ of the controlling member has on its upper side a rail or flange $h^4$ at the edge farthest from the measuring mechanism, and a roll $m$, mounted on the reduced end of stud $f^6$, as clearly shown in Fig. 4, is adapted to engage the flange $h^4$ when the controlling member is moved toward it. Now so long as the computing mechanism is in inoperative position, (shown in Fig. 1,) the movement of the plate F and roll $m$ by the measuring mechanism will carry the roll away from the controlling member, more or less, according to the weight of the article, and if the controlling member is set in parallelism with the path of the stud $f^6$ the roll $m$ will simply slide up and down over the arm $h$. If the arm is in the latter position, corresponding to zero-unit price, the computing mechanism cannot be moved at all, for the flange $h^4$ will bear against the roll $m$, no matter what the position of the latter relative to the length of the arm $h$ and its flange, but if the controlling-arm be moved ever so little to change its angularity it will be moved out of the path of the roll $m$ and at an angle thereto, and the distance between the roll and the flange $h^4$ will increase the farther away the roll $m$ is drawn by the weight of the article. It follows, consequently, that when the operator desires to compute the price he grasps the finger-piece $t^2$ and moves the traveler C to the right until stopped by engagement of the controlling member with the roll $m$, such movement of the traveler being communicated to the hand D, which travels over the scale D' and indicates the aggregate or computed price of the article.

The greater the angularity of the controlling member, and the greater the distance of the roll $m$ from the center of the scale, the greater the distance over which the traveler may be moved by the operator, to indicate a corresponding computed price.

No particular care must be exerted in moving the computing mechanism, the operator merely moving it till it is automatically stopped at the proper point.

A pin $h^5$ (see dotted lines, Fig. 2) on the under side of the arm $h$ is extended through a slot in the traveler and connected to one end of a moderately-strong spring $s^6$, attached at its other end to the under side of the traveler to keep the roll $h^3$ against the track $i$, thus maintaining the controlling member in the angular position determined upon by the unit price controlling mechanism.

By transposing the controlling member to the measuring mechanism, and the coöperating part to the computing mechanism, the result obtained will be the same, and in United States Patent No. 542,970, granted July 16, 1895, such a transposition is shown, although therein the computing mechanism is operated by the measuring mechanism.

I claim—

1. A computing-scale, containing the following instrumentalities, viz: weighing mechanism; normally inoperative price-computing mechanism; means to move said computing mechanism manually when it is desired to compute; a controlling member to determine by its angular position the extent of such movement of the computing mechanism; and means to fix the angularity of the controlling member, substantially as described.

2. A computing-scale, containing the following instrumentalities, viz: weighing mechanism; movable in a right line; normally inoperative price-computing mechanism; means to move said computing mechanism manually and independently of the weighing mechanism; a controlling member to determine by its angular position the extent of movement of said computing mechanism; and manually-operated means to fix the angularity of the controlling member in accordance with the unit price, substantially as described.

3. A computing-scale, containing the following instrumentalities, viz: weighing mechanism; independent price-computing mechanism; means to actuate it manually; a controlling member to determine by its angular position the extent of such movement of the computing mechanism; means to fix the angularity of said controlling member; and visual indicators for and operated respectively by said weighing and computing mechanisms; substantially as described.

4. In a price-computing scale, weighing mechanism movable in a right line; price-computing mechanism, including a traveler movable at right angles to the path of the measuring mechanism; means to manually move the computing mechanism when desired; a controlling member carried by the traveler and movable angularly relative thereto; and a stop on the measuring mechanism, to engage the controlling member and thereby limit the movement of the computing mechanism, the angularity of the controlling member determining the extent of such movement, substantially as described.

5. In a price-computing scale, independent weighing and computing mechanisms; a carriage forming a part of one mechanism and a traveler forming a part of the other movable in paths at right angles to each other, and means to manually move the traveler when desired, combined with a controlling member pivotally mounted on one, and a coöperating roll on the other, to limit the movement of the computing mechanism, and means to change the angular position of the controlling member and thereby vary the extent of movement of the controlling mechanism, substantially as described.

In testimony whereof I have signed my name to this specification in the presence of two subscribing witnesses.

HORACE E. SWIFT.

Witnesses:
JOHN C. EDWARDS,
AUGUSTA E. DEAN.